United States Patent
Kalaiselvam et al.

(10) Patent No.: US 12,088,728 B2
(45) Date of Patent: Sep. 10, 2024

(54) SECURE CONTROLLER AREA NETWORK IN VEHICLES

(71) Applicant: Panasonic Automotive Systems Company of America, Division of Panasonic Corporation of North America, Peachtree City, GA (US)

(72) Inventors: Kumaresh Kalaiselvam, Peachtree City, GA (US); Muthuganesan Muthiah, Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 967 days.

(21) Appl. No.: 16/585,491

(22) Filed: Sep. 27, 2019

(65) Prior Publication Data
US 2020/0112439 A1   Apr. 9, 2020

Related U.S. Application Data

(60) Provisional application No. 62/740,536, filed on Oct. 3, 2018.

(51) Int. Cl.
*H04L 9/32* (2006.01)
*H04L 12/40* (2006.01)

(52) U.S. Cl.
CPC .......... *H04L 9/3242* (2013.01); *H04L 9/3234* (2013.01); *H04L 9/3271* (2013.01);
(Continued)

(58) Field of Classification Search
CPC ... H04L 9/3242; H04L 9/3234; H04L 9/3271; H04L 12/40; H04L 2012/40215;
(Continued)

(56) References Cited

U.S. PATENT DOCUMENTS 8,179,238 B2 * 5/2012 Roberts, Sr. ............. G08G 1/20
340/431
9,705,678 B1 * 7/2017 Wang .................. H04L 63/1466
(Continued)

FOREIGN PATENT DOCUMENTS

CN   101911604 A * 12/2010 ............. E02F 9/205
CN   105745862 A *  7/2016 ........... H04L 9/0861
(Continued)

OTHER PUBLICATIONS

Abnormal Vehicle Behavior Induced Using Only Fabricated Informative CAN Messages by Junko Takahashi, Masashi Tanaka, Hitoshi Fuji, Toshio Narita, Shunsuke Matsumoto and Hiroki Sato pp. 4; Jun. 14, 2018.*
(Continued)

*Primary Examiner* — Eleni A Shiferaw
*Assistant Examiner* — Ali H. Cheema
(74) *Attorney, Agent, or Firm* — Laurence S. Roach, Esq.

(57) ABSTRACT

A system for implementing a secure controller area network (CAN) in a vehicle includes a first electronic controller unit (ECU) dedicated to control a first electronic component of a vehicle, wherein the first ECU comprises a first CAN identification (ID) and a first key. The system may also include a second ECU dedicated to control a second electronic component of the vehicle. The first ECU is to send the first key to the second ECU, and the first ECU is to encrypt the first CAN ID portion of a secure CAN message using the first key. The second ECU is to decrypt the first CAN ID portion of the secure CAN message using the first key from the message table.

19 Claims, 5 Drawing Sheets

(52) U.S. Cl.
CPC .... *H04L 12/40* (2013.01); *H04L 2012/40215* (2013.01); *H04L 2012/40273* (2013.01)

(58) Field of Classification Search
CPC ......... H04L 2012/40273; H04L 9/0822; H04L 9/14; H04L 9/088; H04L 9/0894; H04L 9/3226; H04L 9/0891; H04L 12/40189; H04L 2209/84; H04L 63/1466; H04L 63/0428; H04L 63/06; H04L 63/062
USPC ..................................... 713/170, 171; 726/4
See application file for complete search history.

(56) References Cited

U.S. PATENT DOCUMENTS

| | | | | |
|---|---|---|---|---|
| 9,923,722 | B2* | 3/2018 | Nanjundappa | G07C 5/008 |
| 10,218,499 | B1* | 2/2019 | El Idrissi | H04L 63/065 |
| 10,419,408 | B1* | 9/2019 | Herzberg | H04L 9/3226 |
| 10,715,333 | B2* | 7/2020 | Walrant | H04L 67/12 |
| 11,134,100 | B2* | 9/2021 | Otsuka | H04L 63/123 |
| 2006/0115085 | A1* | 6/2006 | Iwamura | H04L 9/0891 |
| | | | | 380/259 |
| 2014/0040992 | A1* | 2/2014 | Koide | H04L 63/0442 |
| | | | | 726/4 |
| 2015/0263860 | A1* | 9/2015 | Leboeuf | H04L 9/3226 |
| | | | | 713/171 |
| 2016/0057122 | A1* | 2/2016 | van Bergeijk | H04W 12/04 |
| | | | | 713/168 |
| 2016/0315766 | A1* | 10/2016 | Ujiie | H04L 63/0428 |
| 2017/0026348 | A1* | 1/2017 | Martinez | G06F 21/606 |
| 2018/0004964 | A1* | 1/2018 | Litichever | H04L 12/40169 |
| 2018/0077126 | A1* | 3/2018 | Fouet | H04L 63/0435 |
| 2018/0084412 | A1* | 3/2018 | Alfred | H04W 12/0431 |
| 2018/0089918 | A1* | 3/2018 | Murray | H04K 3/65 |
| 2018/0183773 | A1* | 6/2018 | Nakagawa | H04L 63/0428 |
| 2018/0212780 | A1* | 7/2018 | Talamonti | G05D 1/0022 |
| 2018/0359226 | A1* | 12/2018 | Martinez | H04L 63/0442 |
| 2018/0367546 | A1* | 12/2018 | Miyashita | H04L 63/126 |
| 2019/0173862 | A1* | 6/2019 | Kim | H04L 9/3242 |
| 2019/0207915 | A1* | 7/2019 | Schaap | H04L 9/0891 |
| 2020/0044842 | A1* | 2/2020 | Usui | H04L 9/0822 |
| 2021/0150036 | A1* | 5/2021 | Kaneko | G06V 20/56 |
| 2021/0328782 | A1* | 10/2021 | David | H04W 12/0471 |

FOREIGN PATENT DOCUMENTS

| | | | | | |
|---|---|---|---|---|---|
| CN | 107683583 | A | * | 2/2018 | ............. G06F 21/44 |
| CN | 108781164 | A | * | 11/2018 | ............... H04L 9/12 |
| CN | 108076048 | B | * | 2/2022 | ............ H04L 9/0618 |
| CN | 110785961 | B | * | 11/2022 | ............ H04L 9/3247 |
| JP | 2011188176 | A | * | 9/2011 | |
| JP | 2017050717 | A | * | 3/2017 | |
| KR | 20200007972 | A | * | 1/2020 | ........... H04L 63/123 |
| WO | WO-2016075869 | A1 | * | 5/2016 | ......... B60R 16/0231 |
| WO | WO-2018026030 | A1 | * | 2/2018 | ............. H04L 12/40 |
| WO | WO-2018198297 | A1 | * | 11/2018 | ............. G08G 1/092 |

OTHER PUBLICATIONS

Security Evaluation of the Electronic Control Unit Software Update Process By LIIS JAKS (School of Information and Communication Technology, Kungliga Tekniska Hgskolan) pp. 94; (Year: 2014).*

* cited by examiner

100

US 12,088,728 B2

SECURE CONTROLLER AREA NETWORK IN VEHICLES

CROSS-REFERENCED TO RELATED APPLICATIONS

This application claims benefit of U.S. Provisional Application No. 62/740,536 filed on Oct. 3, 2018, which the disclosure of which is hereby incorporated by reference in its entirety for all purposes.

FIELD OF THE INVENTION

The present disclosure generally relates to a method, system, and device for changing the function of multiple electronic controller units to enable encrypted messages to be exchanged between a distributed network of the electronic controller units. More specifically, the present disclosure relates to changing the function of multiple vehicle specific electronic controller units to enable encrypted messages to be exchanged between a distributed network of the electronic controller units without the typically added central processor or other additional signal encryption hardware.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

In present controller area networks in vehicles, electronic controller units exchange messages without encryption. These electronic controller units refer to any embedded system in automotive electronics that controls one or more of the electrical systems or subsystems in a vehicle. Examples of electronic controller units include the Engine Control Module, Powertrain Control Module, Transmission Control Module, Brake Control Module, Central Control Module, Central Timing Module, General Electronic Module, Body Control Module, or Suspension Control Module. The electronic controller unit can correspond to a number of components and sensors of a vehicle and can be a dedicated hardware control to receive sensor information, communicate with other electronic controller units, and control the function of the associated electronic component.

SUMMARY

Generally, the present techniques relate to a system for implementing a secure controller area network (CAN) in a vehicle. The system includes a first electronic controller unit (ECU) dedicated to control a first electronic component of a vehicle. In an example the first ECU includes a first CAN identification (ID) and a first key, where in response to receiving power, the first ECU sends a second ECU the first key. The first ECU also encrypts the first CAN ID portion of a secure CAN message. In the presently disclosed system, the second ECU is dedicated to control a second electronic component of the vehicle distinct from the first component of the vehicle. In an example, the second ECU includes a message table that in response to receiving the first key stores a value of the key in the message table associated with the first CAN ID. In response to receiving the secure CAN message, the second ECU decrypts the first CAN ID portion of the secure CAN message using the first key from the message table.

The present techniques further include a method for implementing a secure CAN. The method includes generating a key, with a first ECU dedicated to control a first electronic component of a vehicle, in response to receiving power at the first ECU. The method further includes sending the key to a distributed number of ECUs each dedicated to their own respective electronic component. Then the method organizes a received key in a message table to correspond to the ECU of origin for the received key. The techniques further disclose composing a secure CAN message including a first CAN ID and a message payload. In an example, the method includes encrypting the first CAN ID portion of the secure CAN message. The secure CAN message can then be sent to a receiving ECU of the distributed number of ECUs. In an example, a received message from one of the distributed number of ECUs can be decrypted with the received key in the message table.

The present techniques also include a tangible, non-transitory, computer-readable medium that can include instructions that, when executed by a processor, implements a secure controller area network (CAN) in a vehicle. The instructions may direct the processor to generate a key, with a first ECU dedicated to control a first electronic component of a vehicle, in response to receiving power at the first ECU. In an example, the instructions can send the key to a distributed number of electronic controller units (ECUs) each dedicated to their own respective electronic component. The instructions may then organize a received key in a message table to correspond to the ECU of origin for the received key. The instructions can then compose a secure CAN message including a first CAN ID and a message payload. In an example, the instructions when executed on the processor then encrypt the first CAN ID portion of the secure CAN message. Once encrypted, the instructions can send the secure CAN message to a receiving ECU of the distributed number of ECUs. In an example, the instructions can decrypt a received message from one of the distributed number of ECUs with the received key in the message table.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
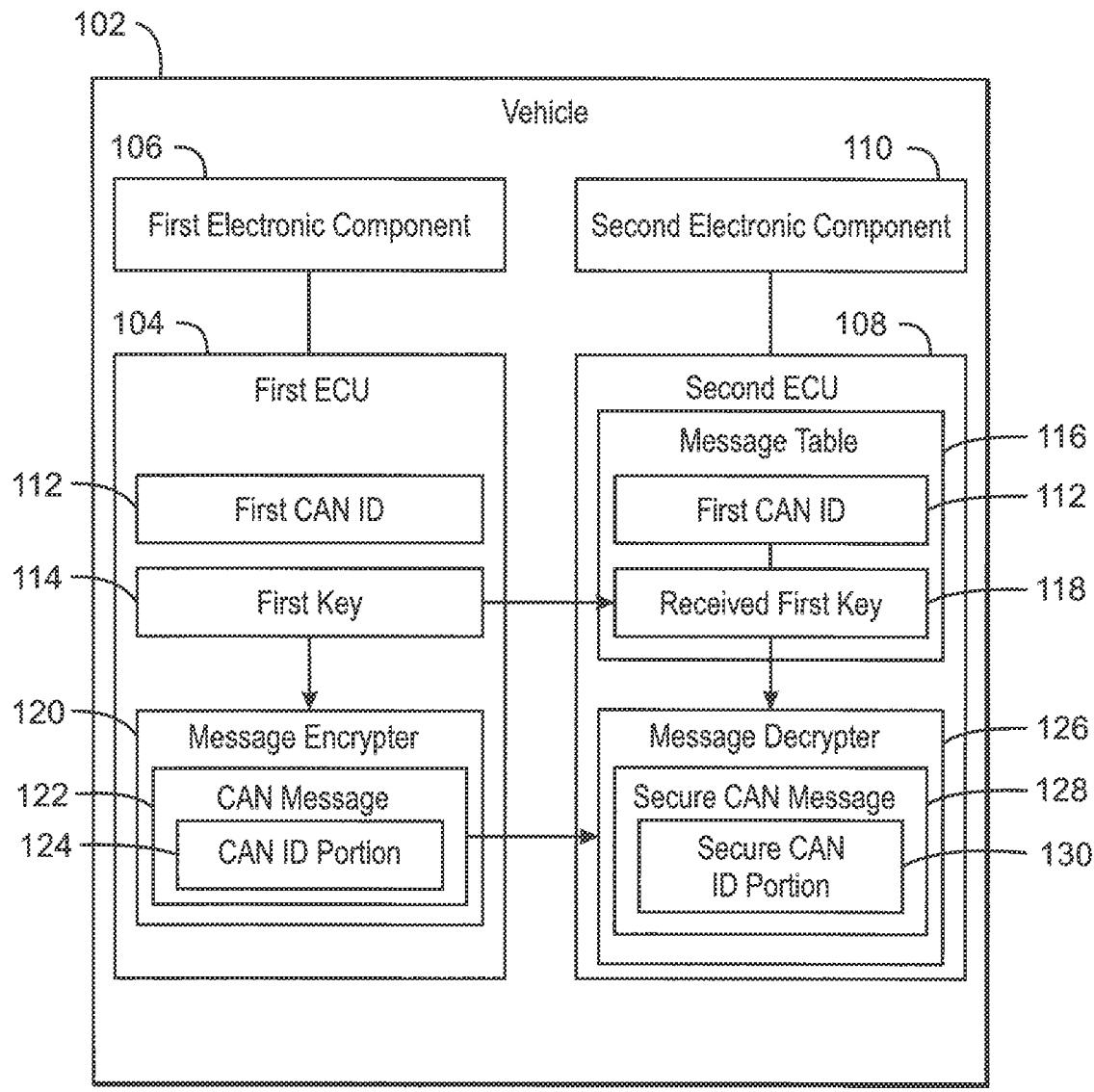
FIG. 1 is a block diagram of an example system for implementing a secure controller area network in a vehicle.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

The present disclosure is related to the automotive network field. As internet enabled cars may be connected to a cloud server or the internet generally, unencrypted messages that are currently sent between components in vehicles are now exposed to security threats as these messages may be intercepted or corrupted from the outside connections of the vehicle. This disclosure improves the security of data sent over a controller area network (CAN) in a vehicle and reduces vulnerability of vehicle components for a network or internet connected vehicle. The techniques disclosed herein include at least one key exchange message, which is an encrypted message sent over a CAN to exchange a key for an ECU. The key exchange message may include a key exchange message ID to be used by an ECU when sending the key exchange message. This key exchange message ID is specified during network design. For example, each ECU supplier can use this key exchange message ID to identify the transmitter of the key.

In the embodiments discussed below, each ECU may send the CAN message key to all other ECUs, which are receiving the CAN message key through an AES encryption algorithm. Following the format of CAN protocol, this key can be 2 bytes or 4 bytes based on the vehicle architecture. The message key can also be exchanged during the startup. These key exchange messages are the first messages sent from each ECU prior to any other types of messages being sent from the ECU after power up. In an example, ECUs provide a mechanism to request that a Key be redelivered or regenerated on demand. In response an ECUs receiving the encrypted message, the key for that message shall be used in a logical XOR (exclusive OR) of the assigned CAN message ID and Key. When an ECU receives a CAN message, it can do logical XOR on the received CAN message ID to retrieve the assigned CAN ID. As each ECU maintains a table of Key Message ID, Key ID, and List of CAN message IDs, the CAN ID can be used in identifying the origin ECU of the message.

FIG. 1 is a block diagram of an example system 100 for implementing a secure controller area network in a vehicle. Arrows are shown to show a general flow of information however they do not indicate a purely one way flow of information. Likewise, lines shown connecting components may indicate an association between the components either through physical or communicative connection.

The system 100 shown in FIG. 1 can be a vehicle 102 such as an automobile, however all types of vehicles using electronic control units are contemplated and included in the term vehicle. The vehicle 102 includes a first electronic control unit (ECU) 104 that corresponds to a first electronic component 106. The first electronic component 106 may be a temperature sensor associated with the engine of the vehicle. The first ECU 104 may control and/or and monitor the first electronic component 106. The first ECU 104 can also communicate bi-directionally with a second ECU 108 that may be associated with its own second electronic component 110. The second ECU 108 is distinct from the first ECU 104 both physically and logically, and the second electronic component 110 is distinct from the first electronic component 106 both physically and logically. In an example, the second electronic component 110 can be the throttle of the vehicle. The first ECU 104 and second ECU 108 may aid in the sensing, communication, and control of information exchanged between first electronic component 106 and the second electronic component 110. For example, if the first electronic component 106 is a temperature sensor associated with the engine of the vehicle and the second electronic component 110 is the throttle of the vehicle, it may be useful to send the temperature data from the temperature sensor to the throttle. In this way, if the temperature of the engine as measured by the first electronic component 106 exceeds a threshold, the second electronic component 110 can be controlled, based on this information, to reduce the engine throttling to prevent overheating.

The specific components shown in the first ECU 104 or the second ECU 108 are shown for convenience only and, in practice, both ECUs may have all of the components discussed herein and may exchange roles between sending messages, encrypting, receiving, and decrypting as dictated by the situation and communication.

In FIG. 1, the first ECU 104 includes a first CAN identification (ID) 112. The CAN identification may be preset in the ECU such that each specific ECU performing a certain function has a predetermined first CAN ID 112. The CAN ID 112 may be the key exchange message ID discussed above. In an example, these IDs can be agreed upon by ECU manufacturers, working groups for original equipment manufacturers, and the like. The uniformity of CAN ID numbers for ECU's controlling specific components allows each ECU to identify one another in shared instructions or commands. The first ECU 104 can also include a first key 114. In an example, this key may be a randomly generated string of ones and zeros, a decimal number, or a string of alphanumeric characters. The first key 114 may be generated or regenerated each time the first ECU 104 receives power. Upon powering up, the first ECU 104 may generate the first key 114 and send a copy of the first key 114 to the second ECU 108. The generation of the key aids the security of the overall vehicle 102 as the key is not known or knowable outside the vehicle for very long as the first key 114 is generated each time the first ECU 104 powers up, but further, this and other keys are generated on a per-component, per-vehicle basis. Accordingly, sniffing a key or intercepting a key from the bus of a vehicle is unlikely to be helpful on a large scale or for very long. Further, the transmission of the key itself from the first ECU 104 to the second ECU 108 can be done through encryption such as by following the advanced encryption standard (AES).

The second ECU 108 may use a message table 116 to store the received first key 118. In an example, as the first CAN ID 112 is set by manufacturers, the first CAN ID may be already known prior to install or power-up of the second ECU 108 as the message table 116 may include a copy of the CAN ID for each respective type of ECU and corresponding electronic component. Accordingly, in FIG. 1, the message table 116 is shown to already include the First CAN ID 112.

Once the received first key 118 is stored in the message table 116, the received first key 118 may be associated to the first CAN ID 112 already stored in the message table 116. While only two ECUs are shown in FIG. 1, many other ECUs may also exchange keys with the second ECU 108, and those additional keys may also be stored in the message table 116. To this end, the second ECU 108 may also share a key it generates with the first ECU 104 for storage in a message table of the first ECU 104. However, for clarity of function, these reciprocal components and functions are not presently shown in FIG. 1. However, as stated above, all ECU's may include each of the described components and functions, including key generation, message tables, individual CAN IDs, encrypters, and decrypters as discussed more below.

After a key has been generated in one ECU, shared with a second, and stored within a message table of the second ECU 108, the first ECU 104 may wish to communicate a message. The first ECU 104 may include a message encrypter 120 to encrypt a CAN message 122 which includes a CAN ID portion 124. The CAN ID portion 124 may be a portion of the message used to identify the origin ECU of the message. This CAN ID portion 124 can be scrambled, obfuscated, or otherwise encrypted so that if the message is intercepted it will be secure. Notably, the message cannot be interpreted unless the ECU sending the message is known, because each messaging system of each ECU may be unique or use different coding to convey messages. Accordingly, by encrypting the CAN ID portion 124 of a CAN message 122, the message encrypter 120 effectively encrypts the entire message. To encrypt the CAN ID portion 124, the message encrypter 120 uses the first key 114 to modify the CAN ID portion 124 of the CAN message 122. In an example, the message encrypter logically applies an XOR cipher function to the CAN ID portion using the first key 114.

Once the CAN message 122 is encrypted, it can be sent to the second ECU 108 where it can be decrypted by a message decrypter 126. The encrypted message may be received as a secure CAN message 126 including a secure CAN ID portion 130. As discussed above, secure CAN ID portion 130 may be an encrypted identification of the origin ECU, in this case the first ECU 104. To decrypt the secure CAN ID portion 130, the second ECU 108 may use the received first key 118 stored in the message table 116 to reverse the encryption. In an example, the message decrypter 126 may reverse the XOR cipher function on the secure CAN ID portion 130 using the received first key 118. This may unencrypt the secure CAN ID portion 130 such that it may be compared to the CAN IDs stored in the message table. Through comparison, the CAN ID identified in the decrypted message can be matched to the CAN ID stored in the message table 116 and the message may be interpreted knowing the source ECU for interpretation of instructions.

Figure 2:
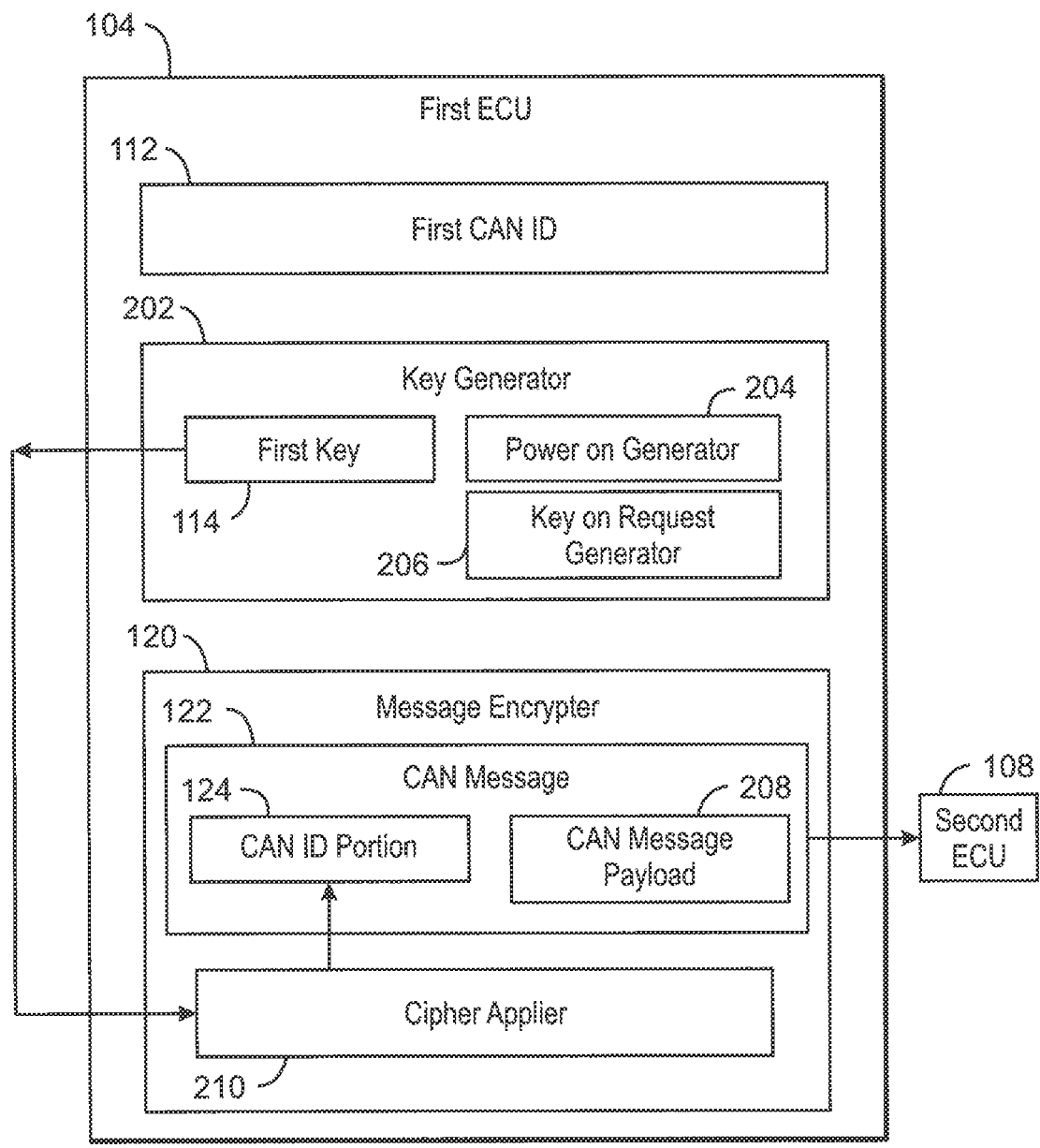
FIG. 2 is a block diagram of an example electronic controller unit implementing a secure controller area network in a vehicle.

FIG. 2 is a block diagram of an example electronic controller unit 200 implementing a secure controller area network in a vehicle. Like numbered items are as described above for FIG. 1. As before, arrows show a general flow of information and are to aid in understanding but are not to limit the direction of communication.

The first ECU 104 in FIG. 2 includes a key generator 202 that can generate the keys used in encryption. In an example, the first key 114 is generated by the first ECU 104 at the time when the first ECU 104 powers on or when the first ECU initially receives power from a power generator 204. Alternatively or in supplement, the key generator may also include a key on request generator 206 to generate a new key upon request. This allows for updating the key for a particular ECU if additional security is needed, after a threshold time of the vehicle's operation, or upon a threshold distance traveled as indicated through other messages to the ECU.

The first ECU 104 also shows additional detail to the composition of the CAN message 122 which here shows both the CAN ID portion 124 and the CAN message payload 208. In an example, the CAN message payload 208 is the substance of the message to be delivered to the ECU. In some examples, encryption of the CAN message only encrypts the CAN ID portion 124 while the CAN message payload 208 can be unencrypted. This encryption functionality is specific to the ECU context where lack of knowledge about the origin ECU or the ECU's associated electronic component makes interpretation of even an unencrypted CAN message payload 208 impractical or unusable. Accordingly, fewer resources for encryption are used or added on, where in other systems, additional encryption hardware or power supply would be added in order to support constant encryption and decryption of entire messages. Using the present techniques not only changes the way the hardware functions due to the encrypting of transmitted messages, but also eliminates a typical intermediary component for encrypting messages between the ECUs, allowing each ECU to continue direct communications.

The first ECU 104 is also shown here to have a cipher applier 210. As a note, while the term cipher applier is used, other modes or types of encryption may also be used by the ECU 104. However, one example of encryption is through application of the XOR cipher to the CAN ID portion 124 using the first key 114 to render the CAN message 122 secure and ready for sending to the second ECU 108.

Figure 3:
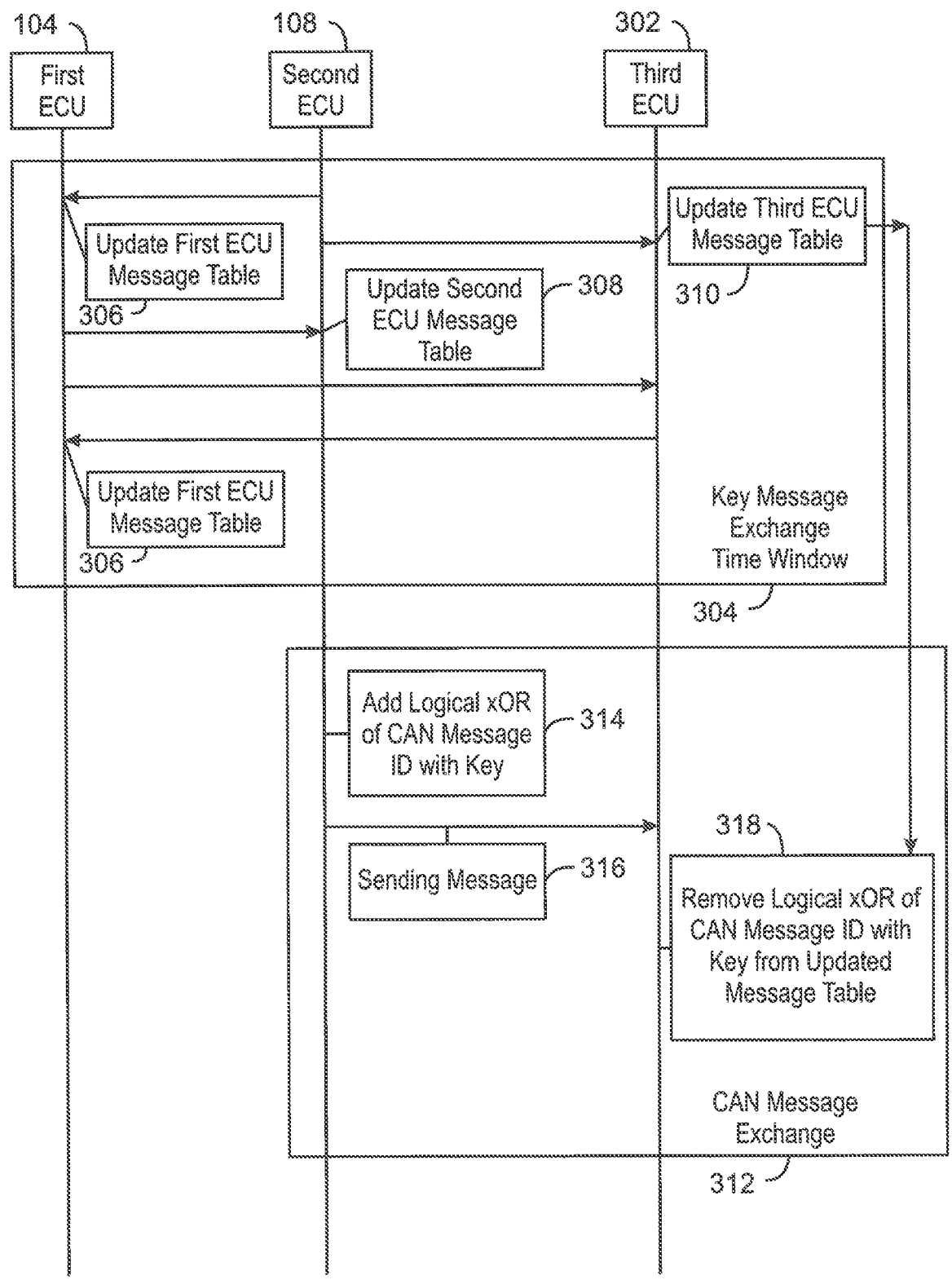
FIG. 3 is a schematic of an example timing diagram for implementing a secure controller area network in a vehicle.

FIG. 3 is a schematic of an example timing diagram 300 for implementing a secure controller area network in a vehicle. Like numbered items are as described above with respect to FIG. 1. The arrows here indicate a general flow of information or action and not to indicate that only unidirectional movement or communication is possible.

A first ECU 104, second ECU 108, and third ECU 302 are shown and may all be located within the same vehicle. The first ECU 104, second ECU 108, and third ECU 302 may, in response to receiving power, generate keys and exchange the keys with each other during the key message exchange time window 304. This time period is shown in FIG. 3, and shows each ECU exchanging key messages with each other to varying effect. For example, the second ECU 108 is shown sharing its key message with the first ECU 104 where the first ECU updates a firsts ECU message table 306 to include the key received. The second ECU 108 is also shown sharing its key message with the third ECU 302 which, in response updates the third ECU message table 310 to store the key from the second ECU 108. The first ECU is also shown sharing its key message with the second ECU 108, where, in response, the second ECU 108 updates the second ECU message table 308 to store the key received from the first ECU 104.

In some cases, as illustrated here, an ECU such as the third ECU 302 may include a setting that causes the ECU to ignore key messages or other messages from designated ECUs. In FIG. 3, the third ECU 302 has a setting to ignore the key messages from the first ECU 104, and accordingly, when the first ECU 104 sends the third ECU 302 a key message, there is no direct response and the message table of the third ECU 302 is not updated. However, the settings of ECUs also allow an ECU to ignore incoming messages while still communicating with the same ECU it is ignoring.

For example, as shown in FIG. 3, the third ECU 302 can send a key message to the first ECU 104. After receiving the key message, the first ECU 104 updates the first ECU message table 306 to store the key received from the third ECU 302.

After the key messages have been exchanged or the key message exchange time window 304 elapses, then standard operation may begin and CAN message exchange 312 may occur. During the message exchange shown here, the messages may be encrypted by the ECUs, for example, by encrypting the CAN ID portion of the message. In FIG. 3, the exemplary exchange is between the second ECU 108 and the third ECU 302. The second ECU 108 may first add a logical XOR encryption of the CAN message ID portion of the CAN message with the second key 314 and then send the encrypted message 316. Once received, the third ECU 302 may remove the logical xOR operation from the CAN message ID portion of the CAN Message using the earlier received key from the second ECU 108 that is stored in the updated message table 318 of the third ECU 302.

Figure 4:
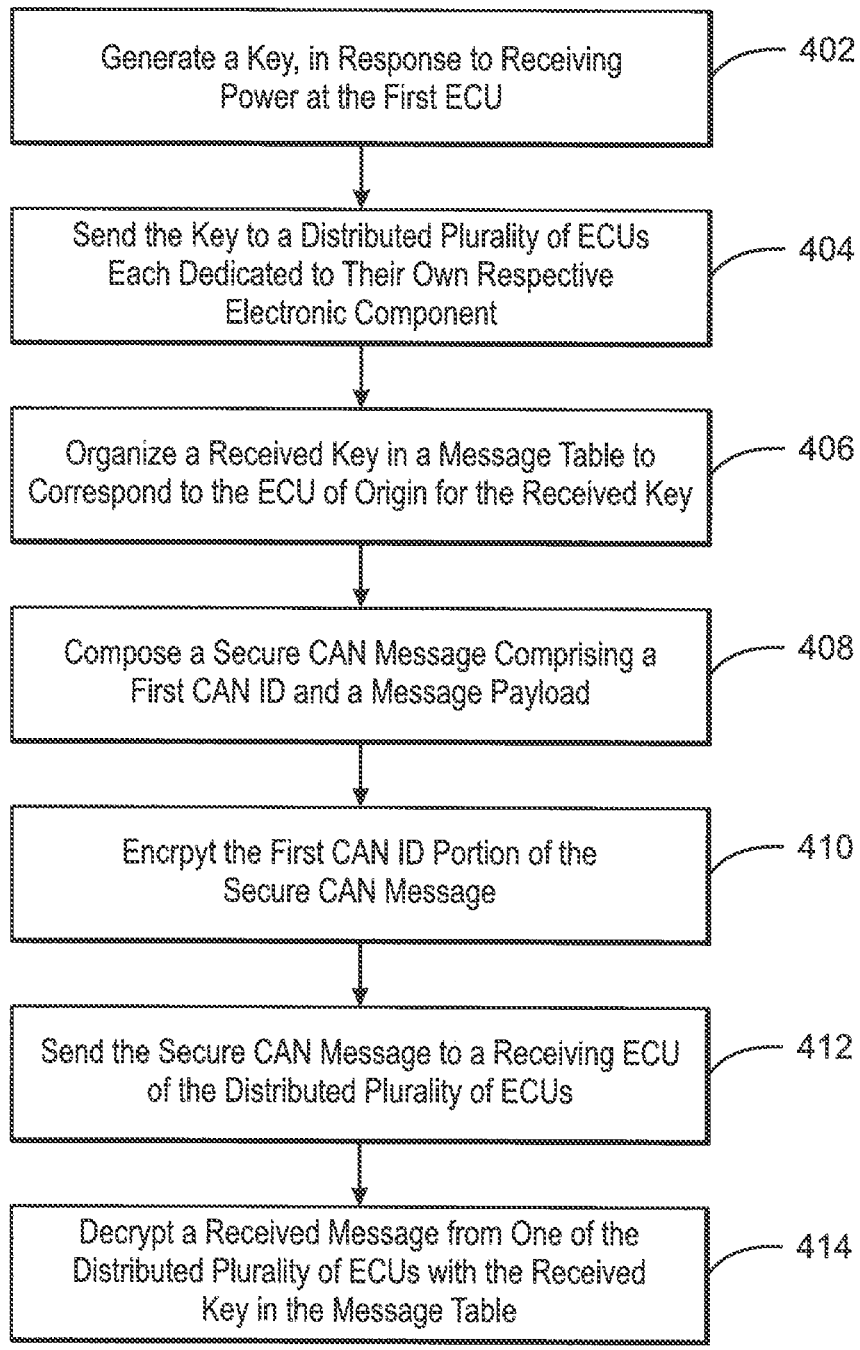
FIG. 4 is a process flow diagram of an example method for implementing a secure controller area network in a vehicle.

FIG. 4 is a process flow diagram of an example method 400 for implementing a secure controller area network in a vehicle. At block 402, the method 400 begins when a first ECU generates a key, where the first ECU is dedicated to control a first electronic component of a vehicle, and where the key is generated in response to the first ECU receiving power at the first ECU. In an example, the first ECU includes a key regeneration module that generates a new key upon each power up of the vehicle. The first ECU may include a key regeneration module that generates a new key upon receipt of a key generation request.

At block 404, the method 400 is enacted through the first ECU which is to send he key to a distributed number of electronic controller units (ECUs) each dedicated to their own respective electronic component. The term distributed includes both logically and physically distributed such that each of the electronic controller units is distinct from the others both logically and physically and relate to various electronic components in the vehicle. When sending keys, the first ECU may send the first key to a second ECU using advanced encryption standard (AES) encryption. Other encryption standards may be used as well. In an example, no encryption is used to send a key from one ECU to another. Each time a new key is generated, the key message may be sent to other ECUs from the ECU generating the key. In an example, the first ECU sends the first key to a second ECU prior to the first ECU sending any other messages.

At block 406, the method 400 implemented on the first ECU organizes a received key in a message table to correspond to the ECU of origin for the received key. In an example, the message table organizes a unique CAN ID for each of a distributed number of electronic controller units preset prior to the vehicle powering on. This may be achieved through the development of unique CAN IDs in development groups or agreed upon by standard prior to implementation. Once decided upon, a unique CAN ID may become associated with each ECU corresponding to a particular electronic component. This correspondence can be recognized by ECU manufacturers who preprogram into ECUs a message table that includes each of the CAN IDs that have been previously determined.

At block 408, the method 400 is implemented in an ECU which composes a secure CAN message including a first CAN ID and a message payload. The secure CAN message includes an unencrypted message payload distinct from the first CAN ID portion of the secure CAN message. In an example, a message payload may include details to be implemented and may remain unencrypted during transit because the nature of CAN messages is that unless you know the ECU corresponding to the message, then the instructions, notes, or commands stored in the message payload become meaningless. Accordingly, by encrypting only the CAN ID portions of the CAN messages, the encrypting computer can be configured to encrypt less data. This is a more efficient encryption regime than what is currently done which either lacks encryption or requires additional processing hardware, dedicated encryption modules and accompanying increases in power supply. By reducing the amount of the message encrypted to merely the identity, the use of additional hardware to encrypt the full message can be avoided. This improvement is not only enabled by the present techniques, but is further available specifically for CAN type messages which distinguish between payload and ID portions.

At block 410, the method 400 is implemented in an ECU which encrypts the first CAN ID portion of the secure CAN message. In an example, the encryption of the first CAN ID portion of the secure CAN message includes a logical exclusive OR (xOR) cipher of the first CAN ID and the key. By obfuscating the CAN ID through a cipher of the CAN ID portion and the key, the resulting combination is encrypted and may be transmitted to another ECU for decryption.

At block 412, the method 400 is implemented in an ECU which sends the secure CAN message to a receiving ECU of the distributed number of ECUs. The payload portion may be unencrypted while the CAN ID portion may be encrypted.

At block 414, the method 400 is implemented in an ECU which decrypts a received message from one of the distributed number of ECUs with the received key in the message table. In an example, the decryption of the received message includes removing a xOR cipher of the received message by using the received key stored in the message table. As noted above, the key from each ECU was received prior to any other messages being sent. Accordingly, any ECU that has received the key has stored that key in the receiving ECU's message table. These stored keys can be used to remove an earlier applied cipher through XOR logical operations, and once the earlier applied cipher is removed, the value remaining after the cipher removal process can be compared to the electronic controller unit list in order to then interpret the payload knowing the identity of the ECU.

Figure 5:
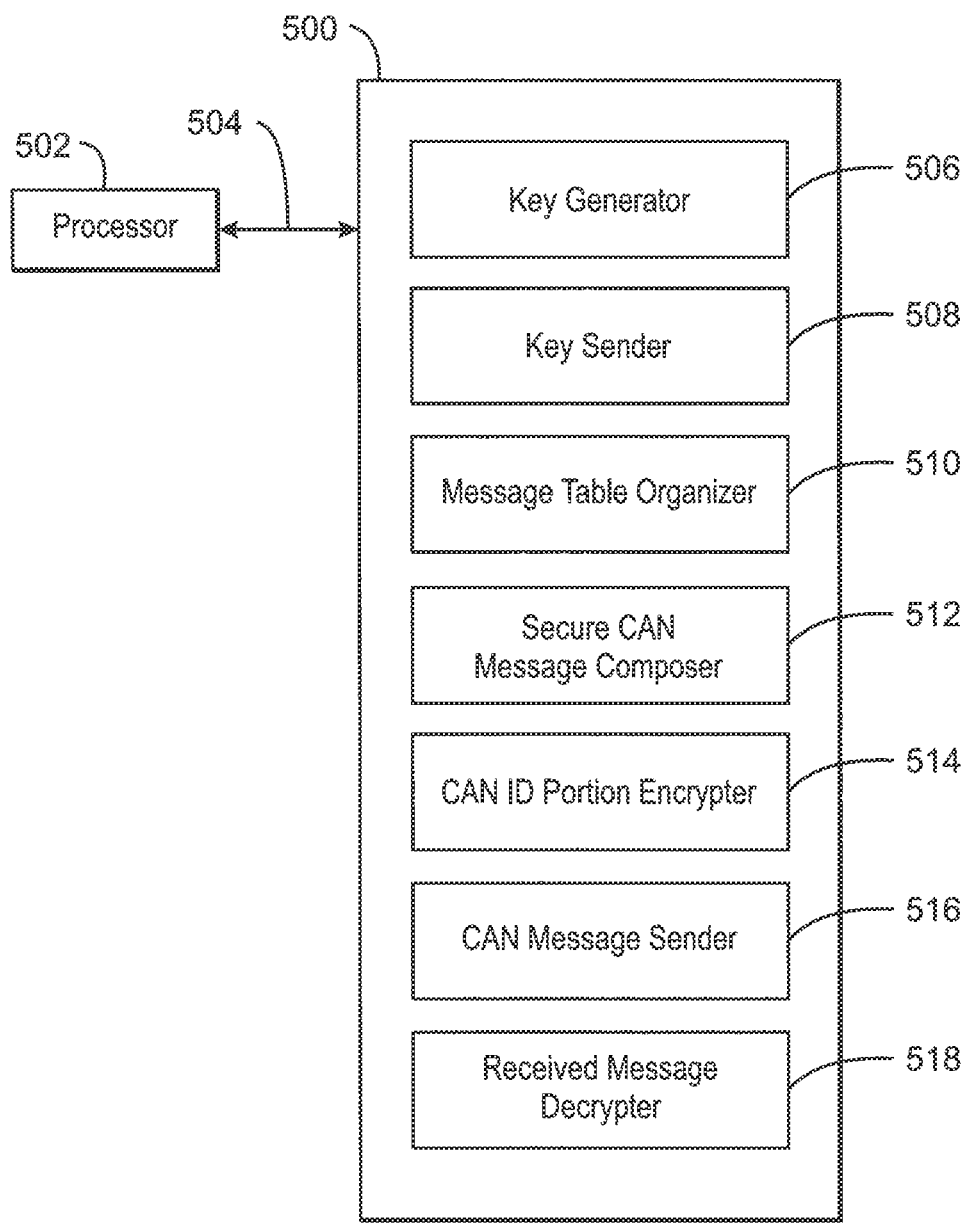
FIG. 5 is a block diagram of an example computer-readable medium storing instructions, that when executed on a processor implements a secure controller area network in a vehicle.

FIG. 5 is a block diagram of an example computer-readable medium storing instructions, that when executed on a processor implements a secure controller area network in a vehicle. The tangible, non-transitory, computer-readable medium 500 includes instructions that, when executed by a processor 502 can direct the processor 502 through a bus 504 to implement a secure controller area network messaging system.

The computer-readable medium 500 includes instructions that when executed on a processor direct a key generator 506 to generate a key. The key may be generated in response to receiving power at the first ECU. In an example, the first ECU includes a key regeneration module that generates a new key upon each power up of the vehicle. The first ECU may include a key regeneration module that generates a new key upon receipt of a key generation request.

The computer-readable medium 500 includes instructions that when executed on a processor direct a key sender 508 to send the key to a distributed number of electronic controller units (ECUs) each dedicated to their own respective electronic component. The term distributed includes both logically and physically distributed such that each of the electronic controller units is distinct from the others both logically and physically and relate to various electronic components in the vehicle. When sending keys, the first ECU may send the first key to a second ECU using advanced encryption standard (AES) encryption. Other encryption standards may be used as well. In Key exchange message, key will be encrypted whereas the CAN ID used to send the key will not be encrypted. Each time a new key is generated, the key message may be sent to other ECUs from the ECU generating the key. In an example, the first ECU sends the first key to a second ECU prior to the first ECU sending any other messages.

The computer-readable medium 500 includes instructions that when executed on a processor enact a message table organizer 510 to organize a received key in a message table to correspond to the ECU of origin for the received key. In an example, the message table organizes a unique CAN ID for each of a distributed number of electronic controller units preset prior to the vehicle powering on. This may be achieved through the development of unique CAN IDs in development groups or agreed upon by standard prior to implementation. Once decided upon, a unique CAN ID may become associated with each ECU corresponding to a particular electronic component. This correspondence can be matched to an origin ECU using a message table that includes each of the CAN IDs.

The computer-readable medium 500 includes instructions that when executed on a processor enact a secure CAN message composer 512 to compose a secure CAN message including a first CAN ID and a message payload. The secure CAN message includes an unencrypted message payload distinct from the first CAN ID portion of the secure CAN message. The computer-readable medium 500 includes instructions that when executed on a processor enact CAN ID portion encrypter 514 to encrypt the first CAN ID portion of the secure CAN message. In an example, the encryption of the first CAN ID portion of the secure CAN message includes a logical exclusive OR (xOR) cipher of the first CAN ID and the key. By obfuscating the CAN ID through a cipher of the CAN ID portion and the key, the resulting combination is encrypted and may be transmitted to another ECU for decryption.

The computer-readable medium 500 includes instructions that when executed on a processor enact a CAN message sender 516 to send the secure CAN message to a receiving ECU of the distributed number of ECUs. The payload portion may be unencrypted while the CAN ID portion may be encrypted.

The computer-readable medium 500 includes instructions that when executed on a processor enact a received message decrypter 518 to decrypt a received message from one of the distributed number of ECUs with the received key in the message table. In an example, the decryption of the received message includes removing a xOR cipher of the received message by using the received key stored in the message table. As noted above, the key from each ECU was received prior to any other messages being sent. Accordingly, any ECU that has received the key has stored that key in the receiving ECU's message table.

What is claimed is:

1. A system for implementing a secure controller area network (CAN) in a vehicle comprising:
a first electronic controller unit (ECU) dedicated to control a first electronic component of the vehicle, wherein the first ECU comprises a first CAN identification (ID) and a first key;
a second ECU dedicated to control a second electronic component of the vehicle distinct from the first electronic component of the vehicle, wherein the second ECU comprises a message table, a second CAN ID, and a second key;
wherein, in response to receiving power, the first ECU is to generate and send the first key to the second ECU, and wherein the first ECU is to encrypt a first CAN ID portion of a secure CAN message using the first key and transmit the secure CAN message to the second ECU, wherein a message payload portion of the secure CAN message is not encrypted;
wherein, in response to receiving the first key, the second ECU is to store the first key in the message table and associate the first key with the first CAN ID, and in response to receiving the secure CAN message, the second ECU is to decrypt the first CAN ID portion of the secure CAN message using the first key from the message table;
where in response to receiving power, the second ECU generates the second key and sends the first ECU the second key, the second ECU to encrypt a second CAN ID portion of a second ECU secure CAN message using the second key and transmit the second ECU secure CAN message to the first ECU; and
wherein the first ECU comprises a first ECU message table that in response to receiving the second key stores a value of the second key in the first ECU message table associated with the second CAN ID, where in response to receiving the second ECU secure CAN message, the first ECU decrypts the second CAN ID portion of the second ECU secure CAN message using the second key from the message table.

2. The system of claim 1, wherein the encryption of the first CAN ID portion of the secure CAN message comprises a logical exclusive OR (xOR) cipher of the CAN ID and the first key.

3. The system of claim 2, wherein the decryption of the first CAN ID portion of the secure CAN message by the second ECU comprises removal of the xOR cipher by using the first key stored in the message table.

4. The system of claim 1, wherein the first ECU comprises a key regeneration module that generates a new first key upon each power up of the vehicle.

5. The system of claim 1, wherein the first ECU comprises a key regeneration module that generates a new first key upon receipt of a key generation request.

6. The system of claim 1, wherein the first ECU sends the second ECU the first key using advanced encryption standard (AES) encryption.

7. The system of claim 1, wherein the first ECU sends the second ECU the first key prior to the first ECU sending any other messages.

8. The system of claim 1, wherein the message table comprises the first CAN ID prior to the power up of the vehicle.

9. The system of claim 1, wherein the unencrypted message payload is distinct from the encrypted first CAN ID portion of the secure CAN message.

10. A method for implementing a secure controller area network (CAN) in a vehicle comprising:
generating a first key with a first electronic controller unit (ECU) dedicated to control a first electronic component of the vehicle in response to receiving power at the first ECU;

sending the first key to a distributed plurality of electronic controller units (ECUs) each dedicated to their own respective electronic component;

organizing, in response to receiving at the first ECU a second key generated by a second electronic controller unit (ECU) of origin, the second key in a message table to correspond to the second ECU, wherein the second ECU encrypts a second CAN ID portion of a second ECU secure CAN message using the second key and transmits the second ECU secure CAN message to the first ECU;

composing a secure CAN message comprising a first CAN ID and a message payload;

encrypting a first CAN ID portion of the secure CAN message using the first key, wherein the message payload of the secure CAN message is not encrypted;

sending the secure CAN message to a receiving ECU of the distributed plurality of ECUs; and decrypting the second CAN ID portion of the second ECU secure CAN message, received from the second ECU of the origin, with the second key organized in the message table.

11. The method of claim 10, wherein the message table organizes a unique CAN ID for each of the distributed plurality of electronic controller units preset prior to the vehicle powering on.

12. The method of claim 10, wherein the encryption of the first CAN ID portion of the secure CAN message comprises a logical exclusive OR (xOR) cipher of the first CAN ID and the key.

13. The method of claim 12, wherein decryption of the second CAN ID portion of the second ECU secure CAN message received from the second ECU of the origin comprises removing a xOR cipher of the received message by using the received second key stored in the message table.

14. The method of claim 10, wherein the first ECU comprises a key regeneration module that generates a new key upon each power up of the vehicle.

15. The method of claim 10, wherein the first ECU comprises a key regeneration module that generates a new key upon receipt of a key generation request.

16. A tangible, non-transitory, computer-readable medium comprising instructions that, when executed by a processor, implements a secure controller area network (CAN) in a vehicle, the instructions to direct the processor to:

generate a first key in response to receiving power;

send the first key to a distributed plurality of electronic controller units (ECUs) each dedicated to their own respective electronic component;

organize, in response to receiving a second key generated by a second electronic controller unit (ECU) of origin, the second key in a message table to correspond to the second ECU, wherein the second ECU encrypts a second CAN ID portion of a second ECU secure CAN message using the second key and transmits the second ECU secure CAN message to the first ECU;

compose a secure CAN message comprising a first CAN ID and a message payload;

encrypt a first CAN ID portion of the secure CAN message using the first key, wherein the message payload of the secure CAN message is not encrypted;

send the secure CAN message to a receiving ECU of the distributed plurality of ECUs; and decrypt the second CAN ID portion of the second ECU secure CAN message, received from the second ECU, with the second key organized in the message table.

17. The computer-readable medium of claim 16, wherein the message table organizes a unique CAN ID for each of the distributed plurality of electronic controller units preset prior to the vehicle powering on.

18. The computer-readable medium of claim 16, wherein the encryption of the first CAN ID portion of the secure CAN message comprises a logical exclusive OR (xOR) cipher of the first CAN ID and the first key.

19. The computer-readable medium of claim 16, wherein decryption of the second CAN ID portion of the second ECU secure CAN message received from the second ECU of the origin comprises removing a xOR cipher of the received message by using the received second key stored in the message table.

* * * * *